Patented Dec. 2, 1930

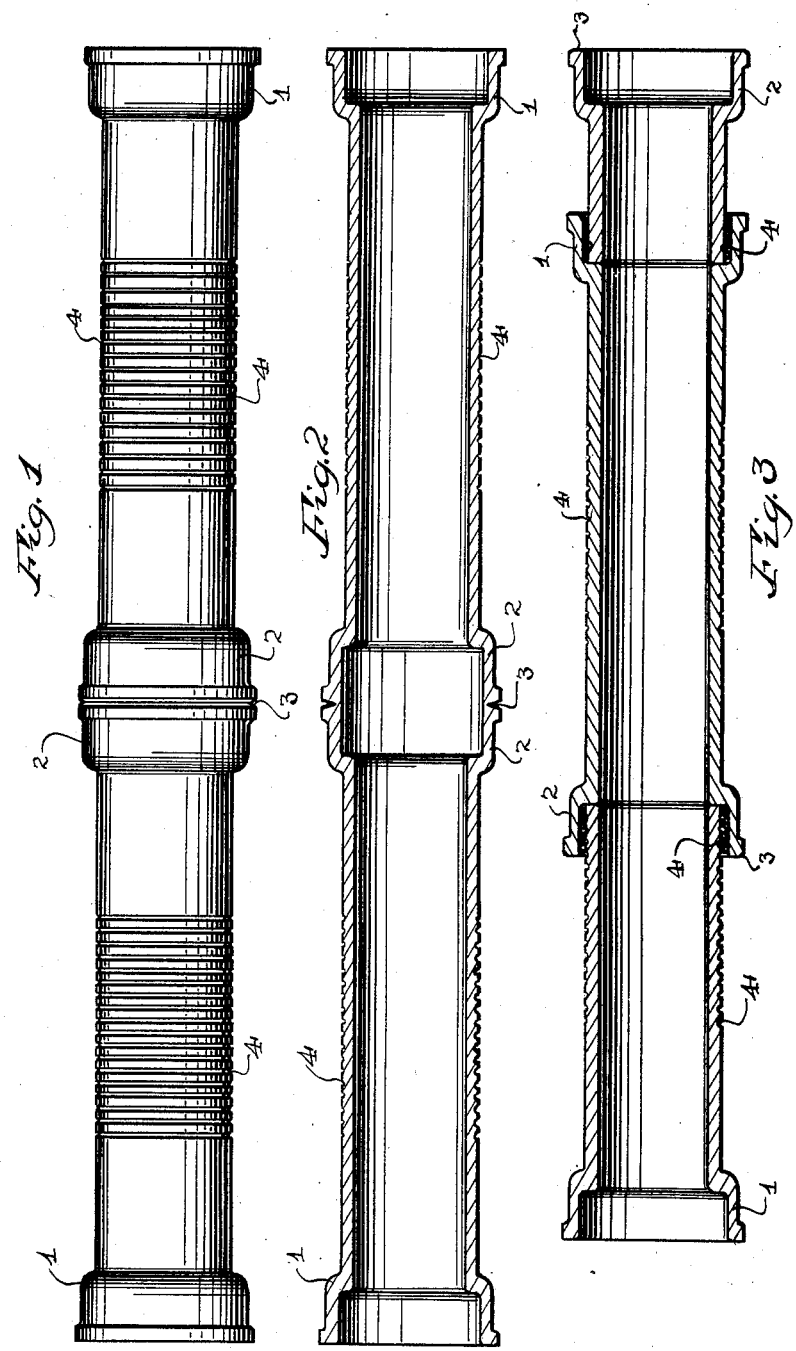

1,783,605

UNITED STATES PATENT OFFICE

ERNEST DELLA, OF ROCHESTER, NEW YORK, ASSIGNOR TO WALTER J. McGUIGAN, OF ROCHESTER, NEW YORK

PIPE

Application filed July 13, 1928. Serial No. 292,461.

The present invention relates to pipes and particularly to the type provided with hubs. An object of this invention is to provide a pipe of this type which may be cut so as to eliminate all waste.

To this and other ends, the invention consists of certain parts and combinations of parts, all of which will be hereinafter described, the novel features being pointed out in the appended claims.

In the drawings:

Fig. 1 is a plan view of a pipe constructed in accordance with this invention;

Fig. 2 is a longitudinal section through the pipe; and

Fig. 3 is a sectional view illustrating the manner in which the pipe may be used.

Prior to this invention soil and other pipes have been made in short sections with a hub at one end thereof and when a shorter section has been desired a piece is removed from that end of the pipe opposite the hub and becomes waste because it is not provided with a hub. As pipe sells for a certain amount per foot, this waste in any one year involves even in a small establishment a considerable amount of money.

According to this invention, the pipe is so constructed that it may be cut to a desired length while the remaining portion still has a hub which can be utilized in the same or some other construction work and does not become waste.

In carrying out this invention each end of the pipe has a hub 1 while between the ends one or more pairs of hubs 2 are provided, the latter hubs facing each other and being connected by a weakened portion 3 extending entirely about the pipe. The pipe may also be provided between its hubs with weakened portions 4 in the form of concentric parallel grooves extending entirely about the pipe.

It is apparent that with this construction, a pipe may be cut at the weakened portion between two hubs to obtain a section of the desired length, the other section being provided with a hub which may be used when a section of such length is desired. Two hubs facing each other may be also separated at the weakened portion connecting them.

What I claim as my invention and desire to secure by Letters Patent is:

1. A pipe having between its ends two hub portions facing each other, a weakened portion surrounding the pipe and connecting the facing hub portions.

2. A pipe having hub portions at opposite ends and two hub portions facing each other, and a weakened portion surrounding the pipe between the hub portions.

3. A pipe having hub portions at opposite ends and a plurality of hub portions facing each other, a weakened portion surrounding the pipe between said facing hub portions, and a plurality of parallel spaced weakened portions surrounding the pipe between the facing hub portions and the end hub portions.

4. A pipe having between its ends a plurality of hub portions arranged close together and facing each other, and a relatively narrow weakened portion surrounding the pipe and connecting said facing hub portions, and a plurality of parallel spaced weakened portions surrounding the pipe between said hub portions and the ends of the pipe.

ERNEST DELLA.